Jan. 2, 1940.  J. ROCKOFF  2,185,738
METHOD OF MANUFACTURING A PRINTING ROLL
Filed March 16, 1937
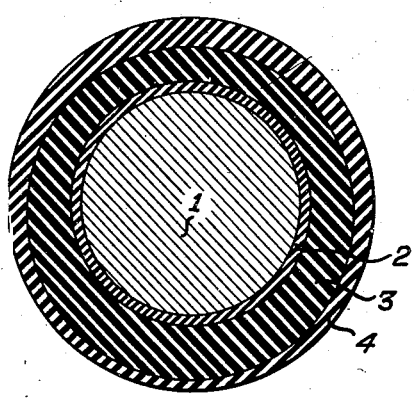
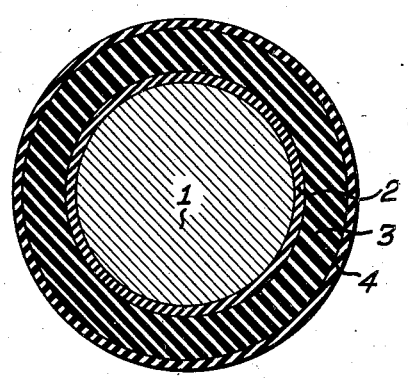
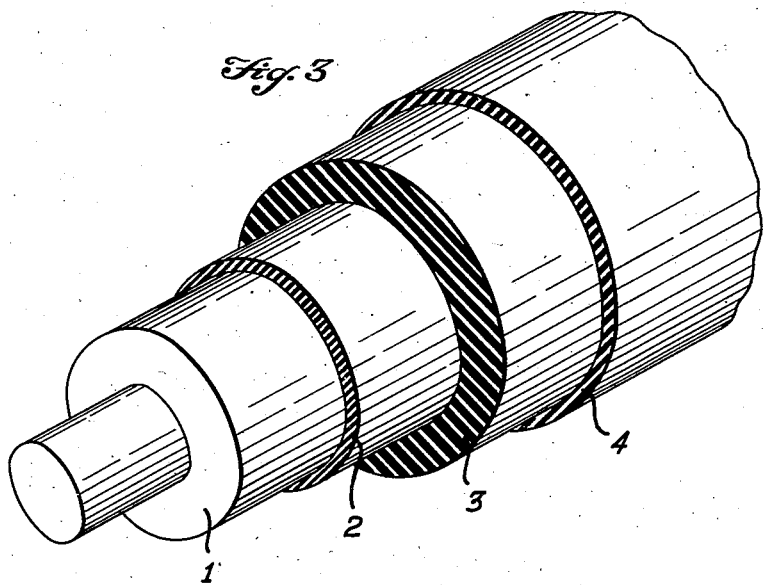
INVENTOR
JOSEPH ROCKOFF
BY
ATTORNEYS Patented Jan. 2, 1940

2,185,738

UNITED STATES PATENT OFFICE 2,185,738

METHOD OF MANUFACTURING A PRINTING ROLL

Joseph Rockoff, Dayton, Ohio, assignor to The Dayton Rubber Manufacturing Company, Dayton, Ohio, a corporation of Ohio Application March 16, 1937, Serial No. 131,213

2 Claims. (Cl. 18—59)

My invention relates to printing rollers.

It is the object of my invention to provide a method of making a printing roller in which the outer covering or veneer and the inner supporting body will be of constant cross section.

It is the particular object of my invention to make a veneer printing roller with a natural rubber or synthetic rubber base and a flexible composition veneer of synthetic rubber or a synthetic resin in which, despite the problem of vulcanizing such materials of diverse character, the cross sections of the respective materials will remain constant.

It is my object to be able to provide such a roller with a natural rubber or synthetic rubber base and with a flexible resin composition veneer, such as a veneer containing a glyptal resin, on which live steam or hot water cannot be used to cure the rollers, as glyptals are destroyed by steam and hot water.

It is a further object to provide a process and a product in which the glyptal resin compositions are not overvulcanized, because when they are overvulcanized they become weak and plastic, and they then lack a uniform surface, which is essential to a successful printing roller.

The especial object of this invention is to provide a process in which the rubber roller is vulcanized in hot water under pressure. This may be performed either by using a rubber or a synthetic rubber or a composition of the two; and to then apply unvulcanized covering veneer (preferably of the flexible glyptal resin type), which is applied as an unvulcanized calendered sheet. The entire structure is then vulcanized in dry heat under pressure, such as air pressure, with a heat sufficient to vulcanize the veneer but not sufficient to affect the base, so that the resulting distortion, if any, of the base, which has been precured, is negligible and the roller thus has a uniform veneered surface when finally ground and finished, and it has just the right amount of cure.

Referring to the drawing:

Figure 1 is a cross section through a roller built and cured in accordance with the prior art.

Figure 2 is a similar section built and cured in accordance with the process of this invention.

Fig. 3 is a perspective with the layers cut-away and showing the internal construction of the roller built according to the process of this invention.

It will be understood that in many types of inker rollers used in relief, gravure and planographic printing, it is desirable to use an outside surface composition, essentially different from the interior composition of the main body of the roller. This type of construction I refer to herein as a "veneer" type roller. Heretofore, prior to my invention, one of the methods of making this roller was as follows: the iron core or axle was first sand-blasted or otherwise cleaned. Then two or more coats of a hard rubber cement were applied. After this cement has dried, a layer of hard rubber gum stock, calendered to a definite thickness, was next applied. The purpose of the hard rubber stock was to bond the soft rubber composition to the iron core. The hard rubber stock was treated with benzol and some times scratched with a wire brush to increase its adhesion to the inner composition.

The inner composition or base of rubber or synthetic rubber was then applied upon the hard rubber in the form of a calendered sheet wound concentrically upon the hard rubber covered shaft. When the stock constituting the body of the roller has thus been built up to a predetermined diameter, which is less than the finished diameter of the roller, at this stage all the cements and compositions are so far unvulcanized.

It was then the practice to apply the outside composition or veneer over the inner composition, or base, that was unvulcanized. This veneer was applied in the form of a calendered sheet in the same manner as the base composition. This veneer layer was built up to such a thickness that the uncured roller was usually one-fourth to one-half inch larger than the final finished diameter of the roller. The reason for this last step was to allow sufficient stock for grinding. The ends of the roller were then confined by means of metal gaskets or other materials and the roller cross-wrapped with wet fabric tape. The roller was then vulcanized under suitable conditions of pressure and temperature, that is, there was only one vulcanization employed.

Elaborate precautions were usually taken to keep the relative positions of the rubber base and the veneer constant. However, due to the pressure of the cross wrappings of wet fabric tape and the weight of the hot plastic stock during vulcanization, there resulted a shift, which resulted in the very undesirable condition of a thick-and-thin veneer, as indicated in Figure 1. In Figure 1, 1 is the axle of metal, 2 the hard rubber cover, 3 the rubber base stock, and 4 the veneer.

As it was the usual procedure to cure rollers in either live steam or hot water, certain very desirable materials and compositions for the veneer could not be employed, as they were not adapted to curing by steam or hot water, as they required either hot air or other hot gas as the vulcanizing medium. For instance, a veneer type roller using a flexible glyptal resin veneer could not be cured by steam or hot water, which would destroy the veneer. These veneers would have to be cured in hot air or other hot gas, but such a procedure was impractical for curing the entire roller, since the process was too time-consuming for a large number of rollers in mass production. It resulted in most cases in an unbalanced cure, with the exterior far overcured, in order to properly vulcanize the interior. When these glyptal resin composition veneers became overvulcanized in the effort to use hot air or other gases to vulcanize both the veneer and the inner body of rubber, then the resin veneers became weak and plastic, and they lacked a uniform surface and uniform thickness.

The present invention deals with a method of manufacturing a veneered roller with a glyptal resin veneer in which the veneer is uniform in thickness and in which the supporting body is uniform in thickness.

The procedure according to my method is to apply the hard rubber coating to the metal axle, and to build up the rubber supporting body in the same manner as heretofore described. When this is done, metal washers are placed on the ends of the rubber roller, it is cross wrapped with a wet jacket liner or a combination of wet jacket liner and fabric tape, and then is vulcanized in hot water under pressure, which vulcanizes the roller body quickly and uniformly.

A typical set of conditions for this purpose is as follows: the time of vulcanization is approximately 180 minutes, the temperature is 250° F. and the pressure 175 pounds per square inch.

The roller at this stage is preferably allowed to stand several days to insure complete shrinkage.

It is then given a first rough grind, that is, the surface is ground to bring it to approximately a true uniform cross section. The roller is so ground that its diameter is smaller than the finished diameter of the completed roller by twice the veneer thickness. This dimension is approximate.

The roller is then cemented on its exterior with a natural rubber or a synthetic rubber cement, depending upon the type of base composition used. If a natural base composition is used, then a natural rubber cement is employed.

I then apply over the vulcanized and cemented base a layer of unvulcanized veneer composition such as a flexible glyptal resin type. This is applied as an unvulcanized calendered sheet. The resulting roller is built up slightly greater in diameter than the finished diameter should be, but not in such excess as in the prior art. Then again metal washers are applied to the ends of the roller, and several layers of dry cross-wrapped tape are applied. The roller is then placed in dry heat of approximately 280° F. degrees under pressure, such as air pressure, of approximately 50 pounds per square inch. The period of vulcanization is for approximately 90 minutes.

This heat is sufficient to vulcanize the veneer, but not sufficient to affect the already vulcanized and ground base. Since the base 3 has been pre-cured, the resultant distortion is negligible.

The roller thus has a uniform base and a uniform veneered surface in cross section, particularly after the veneer has been finally ground and finished. Both bodies have just the right amount of cure and the veneer is vulcanized to the base. The amount of final grinding and finishing of the exterior of the veneer depends upon the nature of the veneer and the uses to which it is to be put.

The old method of forming a veneer on a mandrel and then inflating it to slip it over the rubber base is eliminated.

It will be understood that uniformity of veneer has another material advantage, in that after these rollers have been used in service for a period, they must be refinished by regrinding the surface of the veneer. If the veneer surface is of irregular thickness it is obvious that the amount of grinding is limited by the thinner portion of the veneer, and as this thinner portion is not known, it usually results in the regrinding operation cutting through the veneer and ruining the roller. This is avoided when the veneer is of known uniform thickness, produced according to my process.

I comprehend within my method such variations and modifications of time, temperature, and pressure which may be necessary to adapt it to varying conditions and uses, without departing from the scope of my claims and the scope of my invention. Other resins than the glyptal resins or compositions thereof may be employed. My method is not confined to any particular materials, temperatures or pressures.

Having thus fully described my invention, what I claim as new and desire to secure by Letters Patent, is:

1. In a method of manufacturing a rubber veneer roller of uniform veneer coating thickness, applying a base coating of resilient vulcanizable material to an axle, vulcanizing said base coating under relatively high pressure and low temperature in the presence of moisture, shrinking said vulcanized base coating, grinding the surface thereof to provide the desired diameter roller, applying thereover an unvulcanized veneer coating of resilient material which is deleteriously affected by moisture in the uncured state and vulcanizing said veneer coating to said base coating at relatively low pressure while subjected to dry heat in the absence of moisture whereby to completely cure the veneer coating and vulcanize it to said base coating without adversely affecting the base coating.

2. In a method of manufacturing a rubber veneer roller of uniform veneer coating thickness, mounting a vulcanizable resilient rubber body to an axle, vulcanizing said rubber body on said axle while confining the exterior of the rubber body by wrappings, said vulcanization being effected by the application of heat under pressure in the presence of moisture, removing the wrappings, aging said rubber body until shrinkage thereof is substantially completed, grinding said rubber body surface to the desired diameter, applying thereover an unvulcanized veneer coating, wrapping the veneer coating to confine it to a predetermined size, and vulcanizing the same in dry heat under pressure and at a temperature sufficient to completely cure the veneer coating and vulcanize it to said rubber body without adversely affecting said rubber body.

JOSEPH ROCKOFF.